(12) United States Patent
Dai et al.

(10) Patent No.: US 11,782,336 B2
(45) Date of Patent: Oct. 10, 2023

(54) PROJECTION SCREEN, PROJECTION SYSTEM AND ASSEMBLY METHOD OF PROJECTION SCREEN

(71) Applicant: Hisense Laser Display Co., Ltd, Qingdao (CN)

(72) Inventors: Jie Dai, Qingdao (CN); Zhe Xing, Qingdao (CN)

(73) Assignee: HISENSE LASER DISPLAY CO., LTD, Qingdao (CN)

(*) Notice: Subject to any disclaimer, the term of this patent is extended or adjusted under 35 U.S.C. 154(b) by 75 days.

(21) Appl. No.: 17/491,463

(22) Filed: Sep. 30, 2021

(65) Prior Publication Data

US 2022/0026792 A1 Jan. 27, 2022

Related U.S. Application Data

(63) Continuation-in-part of application No. PCT/CN2020/090941, filed on May 19, 2020.

(30) Foreign Application Priority Data

Jun. 19, 2019 (CN) .......................... 201910529539.9

(51) Int. Cl.
*G03B 21/56* (2006.01)
*G03B 21/625* (2014.01)
(Continued)

(52) U.S. Cl.
CPC .............. *G03B 21/56* (2013.01); *G03B 21/58* (2013.01); *G03B 21/60* (2013.01); *G03B 21/62* (2013.01); *G03B 21/625* (2013.01)

(58) Field of Classification Search
CPC ........ G03B 21/56; G03B 21/60; G03B 21/58; G03B 21/625; G03B 21/62
(Continued)

(56) References Cited

U.S. PATENT DOCUMENTS 1,810,169 A * 6/1931 Gray .................... G03B 21/602
359/452
2,252,554 A * 8/1941 Carothers .............. C08G 69/26
124/90
(Continued)

FOREIGN PATENT DOCUMENTS

CN 1846168 A 10/2006
CN 202548518 U * 11/2012
(Continued)

OTHER PUBLICATIONS

International Search Report and Written Opinion issued in corresponding International Application No. PCT/CN2020/090941 dated Jul. 29, 2020, with English translation.

*Primary Examiner* — Stephanie E Bloss
*Assistant Examiner* — Kevin C Butler
(74) *Attorney, Agent, or Firm* — Morgan, Lewis & Bockius LLP

(57) ABSTRACT

A projection screen includes a screen board, a woven cloth, an adhesive layer, a frame, and elastic connecting members. The woven cloth is arranged on a back of the screen board, and an edge of the woven cloth is outside an edge of the screen board. The adhesive layer is connected to the screen board and the woven cloth respectively. The frame is arranged on a peripheral side of the screen board. First ends of the elastic connecting members are connected to the woven cloth, and second ends of the elastic connecting members are connected to the frame, so as to stretch the woven cloth and the screen board to a flat state by virtue of tension of the elastic connecting members.

18 Claims, 8 Drawing Sheets

(51) Int. Cl.
   *G03B 21/60* (2014.01)
   *G03B 21/58* (2014.01)
   *G03B 21/62* (2014.01)
(58) Field of Classification Search
   USPC ........................................................ 359/443
   See application file for complete search history.

(56) References Cited

U.S. PATENT DOCUMENTS

| | | | | |
|---|---|---|---|---|
| 2,346,257 | A * | 4/1944 | Hehn | G03B 21/56 |
| | | | | 428/81 |
| 4,006,965 | A * | 2/1977 | Takada | G03B 21/60 |
| | | | | 442/232 |
| 5,444,570 | A * | 8/1995 | Uetsuki | G02B 5/3025 |
| | | | | 359/485.05 |
| 7,460,299 | B2 * | 12/2008 | Ogawa | G03B 21/62 |
| | | | | 359/443 |
| 7,554,730 | B1 * | 6/2009 | Kuo | G03B 21/56 |
| | | | | 359/443 |
| 10,054,851 | B2 * | 8/2018 | Sharp | G03B 21/56 |
| 10,444,614 | B2 * | 10/2019 | Maruta | G03B 21/60 |
| 2006/0176555 | A1 * | 8/2006 | Kuo | G02B 6/06 |
| | | | | 348/E5.143 |
| 2006/0187544 | A1 * | 8/2006 | Wiener | G03B 21/62 |
| | | | | 359/449 |
| 2008/0211972 | A1 | 9/2008 | Congard et al. | |
| 2009/0268286 | A1 * | 10/2009 | Wu | G03B 21/60 |
| | | | | 359/443 |
| 2010/0053746 | A1 * | 3/2010 | Seymour | G03B 21/58 |
| | | | | 359/443 |
| 2021/0173293 | A1 | 6/2021 | Li et al. | |
| 2022/0026792 | A1 * | 1/2022 | Dai | G03B 21/56 |

FOREIGN PATENT DOCUMENTS

| | | | | |
|---|---|---|---|---|
| CN | 202548518 | U | | 11/2012 |
| CN | 205281106 | U * | 6/2016 | |
| CN | 205281106 | U | | 6/2016 |
| CN | 108388074 | A | | 8/2018 |
| CN | 108681201 | A * | 10/2018 | ............ G03B 21/56 |
| CN | 108681201 | A | | 10/2018 |
| CN | 112114489 | A * | 12/2020 | ............ G03B 21/56 |
| CN | 112162457 | A * | 1/2021 | ............ G03B 21/56 |
| CN | 112198748 | A * | 1/2021 | ............ G03B 21/54 |
| FR | 2859288 | A1 * | 3/2005 | ............ G03B 21/56 |
| JP | 2007504486 | A * | 3/2007 | ............ G03B 21/56 |
| KR | 10-2017-0001433 | A | | 1/2017 |
| KR | 101777856 | B1 * | 1/2017 | ............ G03B 21/56 |
| WO | 2006091456 | A2 | | 8/2006 |
| WO | WO-2019178982 | A1 * | 9/2019 | ............ G03B 21/54 |
| WO | WO-2020253447 | A1 * | 12/2020 | ............ G03B 21/56 |

* cited by examiner

PROJECTION SCREEN, PROJECTION SYSTEM AND ASSEMBLY METHOD OF PROJECTION SCREEN

CROSS-REFERENCE TO RELATED APPLICATIONS

This application is a continuation-in-part application of International Application No. PCT/CN2020/090941, filed on May 19, 2020, which claims priority to Chinese Patent Application No. 201910529539.9, filed with the Chinese Patent Office on Jun. 19, 2019, which are incorporated herein by reference in their entireties.

TECHNICAL FIELD

The present disclosure relates to the field of projection display technologies, and in particular, to a projection screen, a projection system, and an assembly method of the projection screen.

BACKGROUND

With the continuous development of science and technology, projection display systems are increasingly applied in people's work and life. Laser projection is gradually occupying the market due to its advantages such as wide color gamut, high brightness, and long service life. At present, the projection display systems usually include different types of projection screens such as soft screens and hard screens. The hard screens have been widely used due to their advantages such as good optical gain uniformity, color reproducibility and flatness, and good display effect.

SUMMARY

In an aspect, a projection screen is provided. The projection screen includes a screen board, a woven cloth, an adhesive layer, a frame, and elastic connecting members. At least a partial region of a front of the screen board is configured as a light-receiving region of projection beams. The woven cloth is arranged on a back of the screen board, the woven cloth covers at least a region of the screen board corresponding to the light-receiving region, and an edge of the woven cloth is outside an edge of the screen board. The adhesive layer connects the screen board and the woven cloth to each other. The frame is arranged on a peripheral side of the screen board. First ends of the elastic connecting members are connected to the woven cloth, and second ends of the elastic connecting members are connected to the frame, so as to stretch the woven cloth and the screen board to a flat state by virtue of tension of the elastic connecting members.

In another aspect, a projection system is provided. The projection system includes a projection device and the above projection screen. The projection device is configured to project an image onto the screen board of the projection screen.

In yet another aspect, an assembly method of the above projection screen is provided. The assembly method includes: adhering the adhesive layer with a release paper to the woven cloth, the release paper being located on a side of the adhesive layer away from the woven cloth; removing the release paper to expose the adhesive layer, and adhering the screen board to a surface of the adhesive layer; and stretching the woven cloth to the flat state, and connecting the woven cloth to the frame through the elastic connecting members.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on actual sizes of products, an actual process of a method and actual timings of signals to which the embodiments of the present disclosure relate.

DETAILED DESCRIPTION

Figure 1:
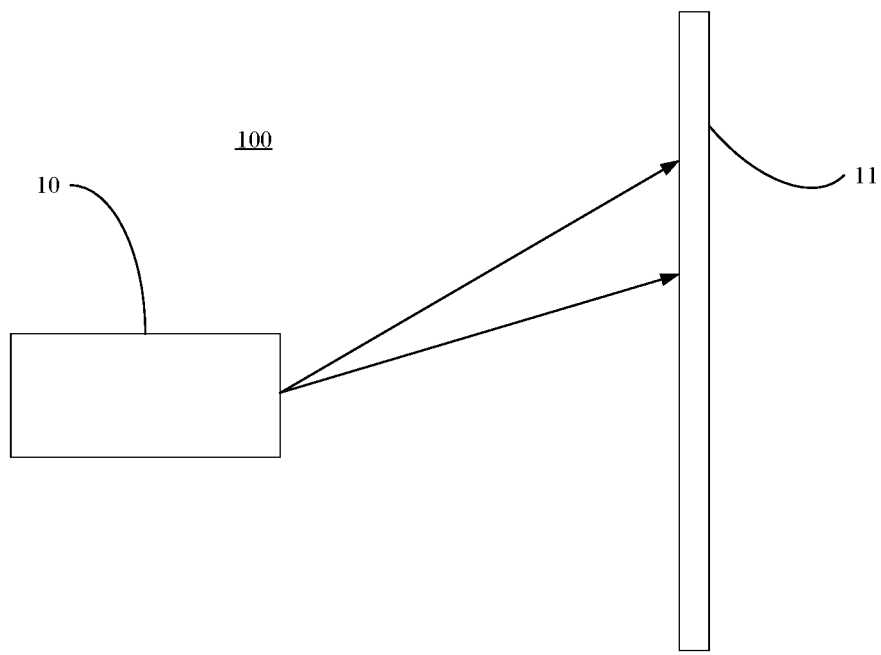
FIG. 1 is a diagram showing a structure of a projection system, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to".

In the description, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" means two or more unless otherwise specified.

In the description of some embodiments, the terms "coupled" and "connected" and their derivatives may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if", depending on the context, is optionally construed as "when" or "in a case where" or "in response to determining" or "in response to detecting". Similarly, the phrase "if it is determined" or "if [a stated condition or event] is detected", depending on the context, is optionally construed as "in a case where it is determined" or "in response to determining" or "in a case where [the stated condition or event] is detected" or "in response to detecting [the stated condition or event]".

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about", "substantially" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel", "perpendicular" or "equal" as used herein includes a stated condition and a condition similar to the stated condition. A range of the similar condition is within an acceptable range of deviation. The acceptable range of deviation is determined by a person of ordinary skill in the art, considering measurement in question and errors associated with measurement of a particular quantity (i.e., limitations of a measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°; the term "equal" includes absolute equality and approximate equality, and an acceptable range of deviation of the approximate equality may be, for example, a difference between two equals of less than or equal to 5% of either of the two equals.

Some embodiments of the present disclosure provide a projection system. Referring to FIG. 1, the projection system 100 includes a projection device 10 and a projection screen 11, and the projection device 10 is configured to project an image onto a screen board of the projection screen 11. In some embodiments, the projection device 10 may be any one of various types of projectors, such as a laser projector. The projection device 10 may project an image onto the screen board of the projection screen 11, so that the projected image may be displayed on the screen board for people to view.

In some embodiments, the projection device 10 is an ultra-short-focus laser projection device with a small projection ratio (the projection ratio is usually less than 0.3, such as 0.24), and projection beams are projected obliquely upwards onto the projection screen 11 at a large inclination angle. In some embodiments, the projection screen 11 may be a front projection screen, which reflects light into human eyes to form an image.

In some embodiments, considering an example in which the projection screen 11 is the front projection screen, the projection screen may be classified as a soft screen and a hard screen. As the name implies, the soft screen may be curled for easy folding and unfolding, while the hard screen cannot be curled and deformed. The soft screen is mainly a glass fiber screen, a glass bead screen, a white plastic screen or a gray screen, and the hard screen is mainly a glass hard screen or a metal hard screen.

Figure 2:
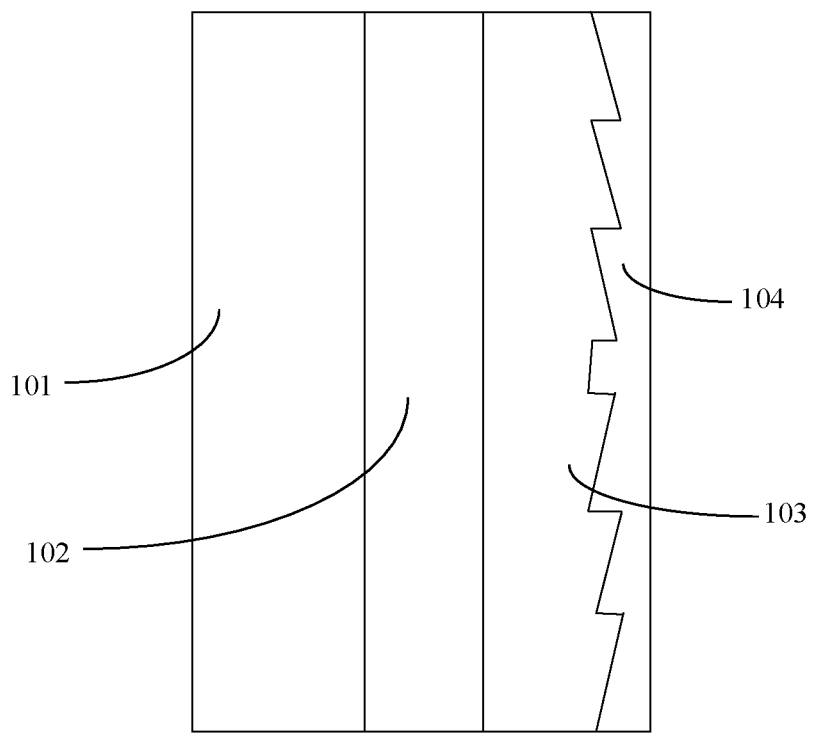
FIG. 2 is a diagram showing a structure of a hard screen, in accordance with some embodiments.

Referring to FIG. 2, the hard screen usually includes optical structure layers, which include a colored layer 101, a diffusion layer 102, a Fresnel lens layer 103, and a reflective layer 104. The colored layer 101 is located on an outermost side of the hard screen, and the projection beams firstly enter the colored layer 101 to enter the optical structure layers, and finally exit the optical structure layers by passing through the colored layer 101. A main function of the colored layer 101 is to improve a color reproduction ability of the hard screen, and the colored layer 101 may also be replaced by a substrate layer at times. The substrate layer includes a colored layer and a hard layer, and the hard layer mainly plays a protective role. The diffusion layer 102 is mainly configured to homogenize uneven incident light and to make light exiting therefrom have a large angle. The Fresnel lens layer 103 is configured to collimate light beams incident thereon at angles within a certain angle range, so that light beams exiting therefrom are parallel, and to diverge light beams reflected by the reflective layer 104. In some embodiments, the reflective layer 104 is an aluminum reflective layer, which is plated on an outer side of the Fresnel lens layer 103.

Figure 3:
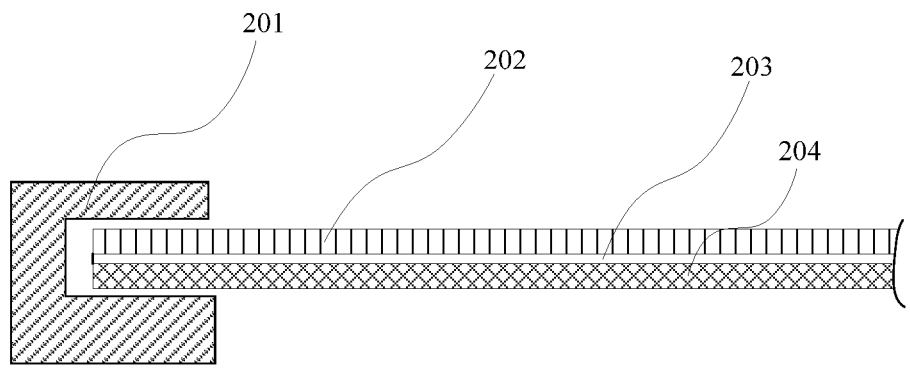
FIG. 3 is a diagram showing a structure of a backplate fixing structure, in accordance with some embodiments.

As a size of the projection screen continues to increase (currently, a size of a mainstream projection screen is usually above 80 inches (i.e., a diagonal length of the projection screen is 80 inches)). In order to fix the fragile hard screen and ensure flatness of the hard screen, in some embodiments, the hard screen may be fixed by using a backplate fixing structure. As shown in FIG. 3, the backplate fixing structure includes a fixing frame 201 and a flat back support plate 204. The hard screen 202 and the back support plate 204 are adhered and fixed through an adhesive 203, and then the back support plate 204 is inserted into the fixing frame 201 to complete support and fixation of the hard screen 202. In this way, the flatness of the hard screen 202 may be maintained through rigidity of the back support plate 204, and deformation of the hard screen 202 may be avoided.

However, the back support plate 204 has a large area, and deformation such as bulges is easy to occur on a surface of the back support plate 204 during fabrication of the back support plate 204. Therefore, it is difficult to meet requirements for the flatness of the hard screen in a case where the hard screen 202 is fixed by using the back support plate 204.

In some embodiments, the hard screen may also be fixed by using the following technical solution. Some embodiments of the present disclosure provide a projection screen 11. As shown in FIGS. 4A to 5A, the projection screen 11 includes a hard screen board 1, a soft woven cloth 2, an adhesive layer 5, a frame 3, and elastic connecting members 4.

The frame 3 is arranged on peripheral sides of the screen board 1. A front of the screen board 1 is a light-receiving surface for receiving the projection beams, and all or part of the light-receiving surface is a light-receiving region. A back of the screen board 1 is adhered to the woven cloth 2 through the adhesive layer 5, the woven cloth 2 covers at least a region on the back of the screen board 1 corresponding to the light-receiving region, and an edge of the woven cloth 2 is outside an edge of the screen board 1. Both ends of an elastic connecting member 4 are connected to the woven cloth 2 and the frame 3. For example, a first end of the elastic connecting member 4 may be connected to the edge of the woven cloth 2, and a second end of the elastic connecting member 4 may be connected to the frame 3, so that the woven cloth 2 and the screen board 1 may be stretched to a flat state by virtue of tension of the elastic connecting member 4.

Figure 4A:
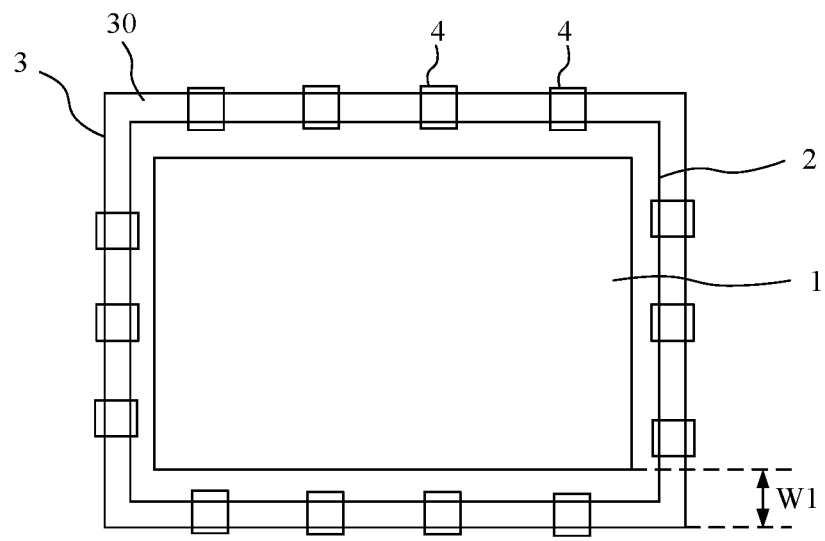
FIG. 4A is a diagram showing a structure of a projection screen, in accordance with some embodiments.
Figure 4B:
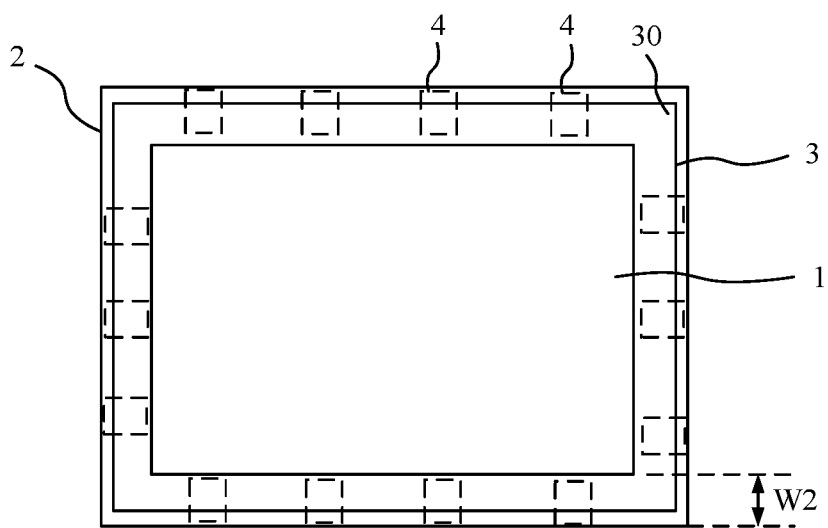
FIG. 4B is a diagram showing a structure of another projection screen, in accordance with some embodiments.
Figure 5A:
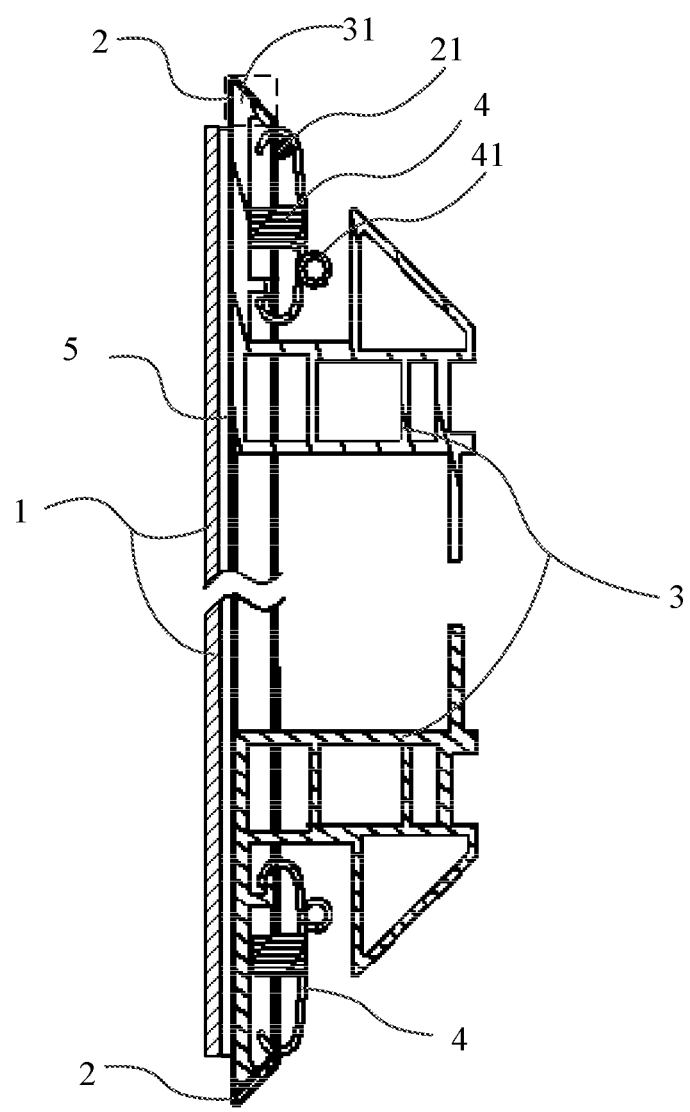
FIG. 5A is a cross-sectional view of a projection screen, in accordance with some embodiments.

As shown in FIGS. 4A to 5A, in order to connect and position the woven cloth 2 and the screen board 1, in some embodiments, the frame 3 encloses a rectangular or square hollow region 30, and the hollow region 30 may be configured to accommodate the screen board 1. The frame 3 may surround the edge of the screen board 1 to provide protection for the screen board 1. The frame 3 and the woven cloth 2 may be connected through the elastic connecting members 4. A structure and a connection relationship of the frame 3 are shown in FIGS. 4A, 4B and 5A. For ease of description, the description will be given below by taking a structure of portions of the frame 3 which are located on upper and lower sides of the screen board 1 as an example. It can be understood that, portions of the frame 3 which are located on left and right sides of the screen board 1 have a similar structure and are in a similar connection relationship to the portions of the frame 3 which are located on the upper and lower sides of the screen board 1, and details will not be repeated herein.

In some embodiments, in a case where the woven cloth 2 and the frame 3 are connected through the elastic connecting members 4, the woven cloth 2, the elastic connecting members 4 and the frame 3 as a whole may have different structures, and they may each at different relative positions.

In some embodiments, as shown in FIG. 4A, a size of the frame 3 is larger than a size of the woven cloth 2, and the frame 3 is outside the edge of the woven cloth 2. In this case, the first ends of the elastic connecting members 4 are connected to the edge of the woven cloth 2, and the second ends of the elastic connecting members 4 extend outward from the edge of the woven cloth 2, and are fixed on the frame 3. Therefore, the woven cloth 2 may be fixed at a center of the frame 3 through the elastic connecting members 4, and the woven cloth 2 is stretched by virtue of elastic force of the elastic connecting members 4, so that the woven cloth 2 may be maintained in a flat stretched state. The projection screen 11 shown in FIG. 4A includes a plurality of elastic connecting members 4.

Since the frame 3 is arranged outside the edge of the woven cloth 2, and the elastic connecting members 4 are outside the edge of the woven cloth 2, there are the elastic connecting members 4 and the frame 3 outside the woven cloth 2, so that there is a wide peripheral region outside the screen board 1 of the projection screen 11. For example, a width of the peripheral region is W1. In order to reduce a size of the peripheral region outside the screen board 1, the elastic connecting members 4 may also be arranged at other positions to reduce the width of the peripheral region.

In some embodiments, referring to FIGS. 4B and 5A, the size of the frame 3 is smaller than the size of the woven cloth 2, and the frame 3 is located inside the edge of the woven cloth 2. In this case, the frame 3 includes a support portion 31 (shown by the dashed box in FIG. 5A). The support portion 31 is located on a back of the edge of the screen board 1, and the support portion 31 is outside the edge of the screen board 1; that is, the support portion 31 does not contact the screen board 1. The edge of the woven cloth 2 extends to outside of the support portion 31 and then is bent in a reverse direction, so as to be connected to the elastic connecting members 4 after wrapping the edge of the support portion 31. The projection screen 11 shown in FIG. 4B includes a plurality of elastic connecting members 4.

The frame 3 is arranged inside the edge of the woven cloth 2, so that there is a narrow peripheral region outside the screen board 1 of the projection screen 11. For example, a width of the peripheral region is W2, and the width W2 is smaller than the width W1. As a result, in a case where sizes of the screen boards 1 are the same, the projection screen 11 shown in FIG. 4B has a smaller outer contour than the projection screen shown in FIG. 4A, so that space occupied by the projection screen 11 may be reduced. Alternatively, in a case where the outer contours of the projection screens 11 are the same, the screen board 1 shown in FIG. 4B has a larger area than the screen board 1 shown in FIG. 4A, so that the light-receiving surface of the screen board 1 may be increased.

Since the woven cloth 2 is adhered to the back of the screen board 1, and the frame 3 generally has a hard structure, the screen board 1 may be damaged if the frame 3 is in direct contact with the screen board 1; while in some embodiments, the frame 3 may be in good contact with and well support the back of the screen board 1 through the soft woven cloth 2.

The support portion 31 is located at an outer edge of the frame 3. For example, the support portion 31 is located in an outermost region of the frame 3. After the woven cloth 2 is adhered to the screen board 1, the edge of the woven cloth 2 is outside the edge of the screen board 1 and may continue to extend outward, is wound to a rear of the frame 3 from the outside of the support portion 31 to wrap the edge of the support portion 31, and then is connected to the elastic connecting members 4. In this way, the woven cloth 2 is hung on the edge of the support portion 31, and the edge of the support portion 31 may serve as a support line to support the woven cloth 2. In this case, the edge of the support portion 31 may be equivalent to a fixed pulley, so that portions of the woven cloth 2 on both sides of the edge of the support portion 31 move in two different directions by virtue of support of the support portion 31.

When an elastic connecting member 4 applies a tension in a direction away from the edge of the support portion 31 to the woven cloth 2 on a back of the support portion 31, the woven cloth 2 on a front of the support portion 31 is pulled in a reverse direction and moves in a direction close to the edge of the support portion 31, thereby achieving the stretching and extension of the woven cloth 2. For example, in an upper structure of the frame 3, when the elastic connecting member 4 applies a downward tension to the woven cloth 2 on the back of the support portion 31, the woven cloth 2 on the front of the support portion 31 is pulled in a reverse direction and moves upward.

A direction of the force to which the woven cloth 2 is subjected may be changed through the support portion 31, so that positions of the elastic connecting members 4 are not limited to the outside of the edge of the woven cloth 2, and the elastic connecting members 4 may be provided within a range covered by the woven cloth 2 when the woven cloth 2 is stretched. In some embodiments, the first ends of the elastic connecting members 4, for example, ends of the elastic connecting members 4 connected to the edge of the woven cloth 2, may be outside the second ends of the elastic connecting members 4. In this case, the elastic connecting members 4 may be hidden at the back of the screen board 1, so that the elastic connecting members 4 may be hidden by the screen board 1 and the woven cloth 2, and it is difficult to see the elastic connecting members 4 from a front of the projection screen 11. As a result, an appearance of the projection screen 11 may be effectively improved.

The direction of the tension of the elastic connecting members 4 may be parallel or approximately parallel to a plane where the screen board 1 is located. Therefore, on one hand, an overall volume and an overall thickness of the projection screen 11 may be reduced. When the elastic connecting members 4 are elastically deformed, a direction of the elastic deformation is parallel to the plane where the screen board 1 is located, or is at a small included angle to the plane where the screen board 1 is located, so that an amount of deformation of the projection screen 11 in a thickness direction is small, and the thickness of the projection screen 11 may be effectively reduced. On another hand, in a case where the direction of the tension of the elastic connecting members 4 is parallel to the plane where the screen board is located, the screen board 1 is easy to stretch and extend along the plane where it is located. As a result, it may be possible to ensure that the screen board 1 is always located in a same plane, and to prevent the screen board 1 from being twisted in other directions due to that the direction of the tension of the elastic connecting members 4 is not parallel to (or is at an included angle to) the plane where the screen board 1 is located.

When the elastic connecting members 4 are connected to the frame 3 or the woven cloth 2, depending on different types and structures of the elastic connecting members 4, the elastic connecting members 4 may be connected to the woven cloth 2 or the frame 3 in different ways.

In some embodiments, the frame 3 is a rigid body, and may be connected to the elastic connecting members 4 by means of clamping, connecting based on threaded fasteners or riveting. Since the woven cloth 2 is made of a soft material, it is not easily connected to the elastic connecting members 4 directly. In some embodiments, there is a rigid connecting structure on the woven cloth 2, so as to achieve the connection between the woven cloth 2 and the elastic connecting members 4 through the connecting structure.

Figure 5B:
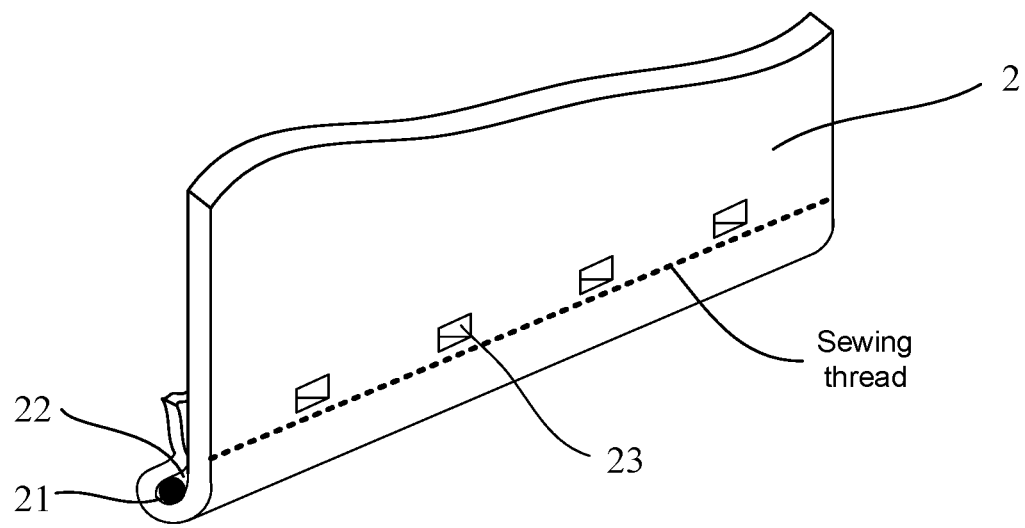
FIG. 5B is a diagram showing a local structure of a woven cloth, in accordance with some embodiments.

In some embodiments, as shown in FIG. 5A, the woven cloth 2 includes a rigid fixing member 21 at the edge of the woven cloth 2. The rigid fixing member 21 is configured to be connected to the elastic connecting members 4. In order to achieve the connection between the woven cloth 2 and the rigid fixing member 21, in some embodiments, as shown in FIG. 5B, the edge of the woven cloth 2 may be enclosed to form a closed hole 22, so that the rigid fixing member 21 may be fixed inside the closed hole 22, and the connection between the rigid fixing member 21 and the woven cloth 2 may be achieved. In some embodiments, the woven cloth 2 includes a plurality of rigid fixing members 21. For example, a rigid fixing member 21 is provided on each of upper, lower, left and right sides of the woven cloth 2.

The woven cloth 2 further includes a through hole 23 on a side of the rigid fixing member 21 away from the edge of the woven cloth 2, so that an elastic connecting member 4 passes through the through hole 23 and is hung on the rigid fixing member 21. In a case where the projection screen 11 includes a plurality of elastic connecting members 4, the woven cloth 2 includes a plurality of through holes 23 in one-to-one correspondence with the plurality of elastic connecting members 4.

The rigid fixing member 21 may have different shapes and structures. For example, the rigid fixing member 21 may have a structure of a straight rod. Correspondingly, as shown in FIG. 5B, the edge of the woven cloth 2 may be curled inward and sewn together with an inside of the woven cloth 2, so that the closed hole 22 matched with the rigid fixing member 21 may be formed at the edge of the woven cloth 2. For example, the straight-rod-shaped rigid fixing member 21 may be inserted in the closed hole 22. In this way, when the rigid fixing member 21 moves due to the tension of the elastic connecting members 4, the woven cloth 2 moves therewith and is stretched to the flat state.

In some embodiments, the rigid fixing member 21 may also be directly sewn to the edge of the woven cloth 2.

Since the woven cloth 2 may be connected to the plurality of elastic connecting members 4 through the rigid fixing member 21, the edge of the woven cloth 2 may not be easily torn or damaged by virtue of bearing force of the rigid fixing members 21. If the plurality of elastic connecting members 4 are directly hung on the woven cloth 2, for example, if they are hung in holes in the woven cloth 2 or rings sewn to the woven cloth 2, the edge of the woven cloth 2 will be easily torn or damaged.

In addition, the rigid fixing member 21 is able to homogenize the tension of the plurality of elastic connecting members 4 from a point of application to a direction in which the rigid fixing member 21 extending, so that the tension may be uniformly applied to the woven cloth 2. As a result, tension of the woven cloth 2 applied to the hard screen board 1 is also uniform everywhere, which is more conducive to achieving flatness of the hard screen board 1.

In some embodiments, in order to connect the rigid fixing member 21, the elastic connecting members 4 may include springs. Referring to FIG. 5A, one end of a spring (e.g., an upper end of the spring located on an upper side of the frame 3) may be connected to the rigid fixing member 21 in a hanging manner, and the other end of the spring (e.g., a lower end of the spring located on a lower side of the frame 3) is fixed on the frame 3.

In order to facilitate assembly, the spring further includes a pull ring 41, which is configured to hook an object. In this way, an operator may insert fingers or other objects into the pull ring 41 to perform operations on the spring such as assembling, disassembling or stretching the spring, thereby facilitating the assembly of the spring with the rigid fixing member 21 and the frame 3 or the disassembly of the spring from the rigid fixing member 21 and the frame 3.

In some embodiments, the elastic connecting members 4 may also include elastic connecting structures such as rubber members, and details will not be repeated herein.

Since the screen board 1 has a large area, there is generally a need to use the plurality of elastic connecting members 4 to jointly stretch the woven cloth 2, so as to effectively stretch the screen board 1 and the woven cloth 2 to the flat state. The plurality of elastic connecting members 4 may be arranged at intervals, and are arranged at an appropriate density. In this way, on one hand, a sufficient indirect tension may be provided to the screen board 1 by using the plurality of elastic connecting members 4; on another hand, there are an appropriate number of elastic connecting members 4, which facilitates to reduce an assembly difficulty.

In some embodiments, the plurality of elastic connecting members 4 may be arranged at intervals around the screen board 1. For example, they are arranged at equal intervals in a manner of up-down symmetry and left-right symmetry. In this way, upper, lower, left, and right directions of the screen board 1 are all subjected to the tension of the elastic connecting members 4. As a result, the screen board 1 may be effectively stretched in all directions, and may be maintained in the flat state.

In some embodiments, the plurality of elastic connecting members 4 are arranged on the upper and lower sides and on the left and right sides of the screen board 1 at different densities. For example, an arrangement density of elastic connecting members 4 on the left and right sides of the screen board 1 may be smaller than an arrangement density of elastic connecting members 4 on the upper and lower sides of the screen board 1. In this way, the plurality of elastic connecting members 4 still surround the screen board 1, however, the elastic connecting members on the upper and lower sides of the screen board 1 are arranged densely, and the elastic connecting members on the left and right sides are arranged sparsely. Therefore, the upper and lower sides of the screen board 1 are subjected to a large tension, which may effectively resist a stress which makes the screen board 1 to be bent inward or expand outward. A stress which makes the screen board 1 to be bent in a vertical direction is very small, due to natural sagging of the screen board 1, thus the elastic connecting members 4 on the left and right sides are subjected to a small tension.

Figure 10A:
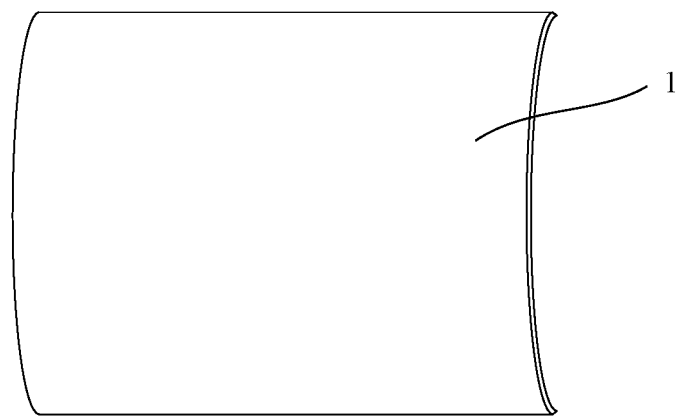
FIG. 10A to 10D are schematic diagrams when a screen board in a projection screen is bent, in accordance with some embodiments.
Figure 10B:
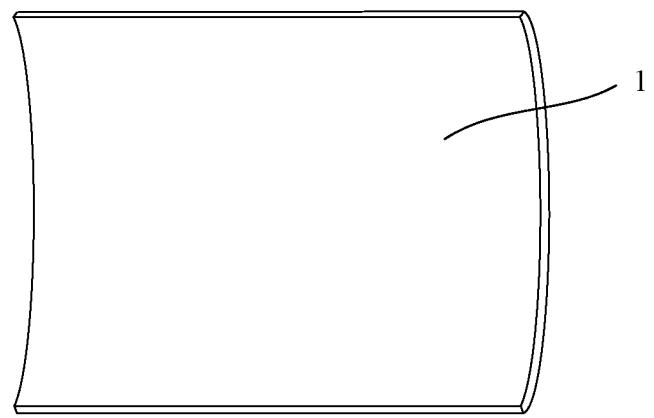
Figure 10C:
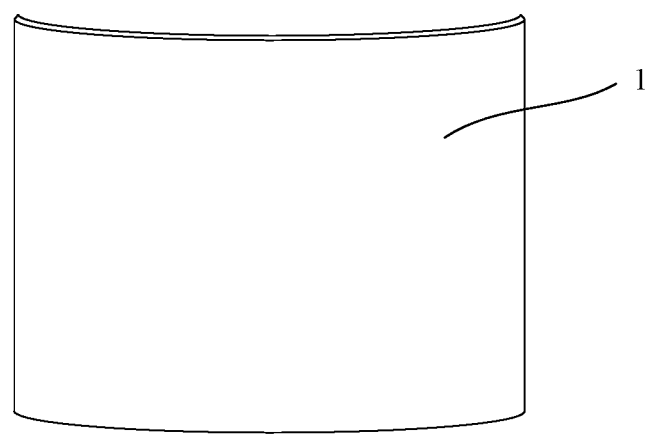
Figure 10D:
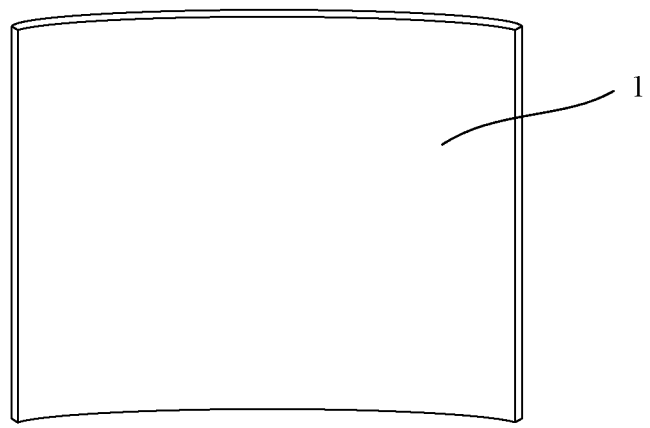

For example, when a viewer stands facing the screen board 1, a side of the screen board 1 close to the viewer is an inside, and a side of the screen board 1 away from the viewer is an outside. As shown in FIG. 10A, the screen board 1 being bent inward means that a middle portion of the screen board 1 is bent in a direction close to the viewer. As shown in FIG. 10B, the screen board 1 being bent outward means that the middle portion of the screen board 1 is bent in a direction away from the viewer. For example, when the viewer stands facing the screen board 1, as shown in FIG. 10C, the screen board 1 being bent in the vertical direction means that the middle portion of the screen board 1 is bent from left to right or from right to left in the direction close to the viewer. Alternatively, as shown in FIG. 10D, the screen board 1 being bent in the vertical direction means that the middle portion of the screen board 1 is bent from left to right or from right to left in the direction away from the viewer.

Compared with that the plurality of elastic connecting members 4 are arranged on the upper and lower sides and on the left and right sides of the screen board 1 at a same density, although the number of the plurality of elastic connecting members 4 arranged in such a way described above is reduced, appropriate tensions may still be applied to various directions of the screen board 1 in combination with stretching requirements of the screen board 1 in different directions, so that good stretching and fixing effects may be achieved; in addition, the reduction in the number of the plurality of elastic connecting members brings certain convenience to installation.

In order to improve the appearance of the projection screen 11, in some embodiments, the projection screen 11 further includes a front decorative frame, and the front decorative frame is located on the front of the screen board 1. The front decorative frame is connected to the frame 3, and is configured to cover the edge of the woven cloth 2 (as shown in FIG. 4B), or is configured to cover the edge of the woven cloth 2 and the plurality of elastic connecting members 4 (as shown in FIG. 4A). In this way, the front decorative frame is arranged on the frame 3, and covers the woven cloth 2 exposed outside the edge of the screen board 1, so that the woven cloth 2 is prevented from being exposed. When viewed from the front of the projection screen 11, the front decorative frame is outside the front of the screen board 1, so that the appearance of the front of the projection screen 11 may be effectively improved. In some embodiments, the front decorative frame may have a structure similar to that of the frame 3 or the fixing frame 201, such as a rectangular frame structure, which is not limited in the present disclosure.

In some embodiments, a surface of the front decorative frame may be treated through a surface treatment process to further improve an appearance of the front decorative frame. In some embodiments, the surface treatment process includes electroplating, wire drawing or paint spraying.

In some embodiments, the front decorative frame and the frame 3 may be connected by means of clamping, bonding or connecting by virtue of threaded fasteners.

The screen board 1 of the projection screen 11 is usually made of a hard material, such as glass or metal, which makes the screen board 1 have great rigidity and strength. Therefore, when the screen board 1 is stretched, a flat surface may be formed. As a result, at least a partial region of the front of the screen board 1 may be configured as the light-receiving region of the projection beams, so that an image may be projected on the front of the screen board 1 for display.

Since the hard material that the screen board 1 is made of is generally hard and brittle, if holes or grooves are directly formed in the hard screen board 1, the screen board 1 is easy to crack. In order to connect and fix the hard screen board 1, in some embodiments, the projection screen 11 further includes the soft woven cloth 2. The woven cloth 2 may be adhered to the hard screen board 1 through the adhesive layer 5, and is connected to the elastic connecting members 4, so that the screen board 1 is fixed.

The woven cloth 2 and the screen board 1 are adhered to each other through the adhesive layer 5, therefore the stretching of the woven cloth 2 may affect the bending or stretching of the screen board 1 through the adhesive layer 5. In order to achieve the connection with the screen board 1, the woven cloth 2 should have a sufficient size to cover at least a region on the back of the screen board 1 opposite to the light-receiving region on the front of the screen board 1. In this case, a back of the light-receiving region is adhered to the woven cloth 2. As a result, in a case where the woven cloth 2 is in the flat stretched state, the light-receiving region configured to receive a projected image in the screen board 1 is also stretched, so that a quality of the displayed image may be improved.

The adhesive layer 5 is a layer with adhesiveness, and is mainly configured to adhere the woven cloth 2 to the screen board 1. Therefore, the adhesive layer 5 may generally be made of a material with adhesiveness, such as a base-less adhesive film. Since the adhesive layer 5 is formed on the back of the screen board 1, it may be considered that the adhesive layer 5 is provided in a dark color such as black, so as to minimize reflection effect of the adhesive layer 5 on light projected on the light-receiving surface of the screen board 1, and to improve optical display performance of the screen board 1.

In addition, a thickness of the adhesive film may be reduced to further reduce the thickness of the entire projection screen 11 and improve the flatness of the screen board 1. For example, the thickness of the adhesive film may be set in a range of 0.08 mm to 0.15 mm inclusive. For example, it may be 0.08 mm, 0.09 mm, 0.1 mm, 0.11 mm, 0.12 mm, 0.13 mm, 0.14 mm, or 0.15 mm. In a case where the thickness of the adhesive film is less than 0.08 mm, a strength of the adhesion between the screen board 1 and the woven cloth 2 may be affected. In a case where the thickness of the adhesive film is greater than 0.15 mm, the tension to which the woven cloth 2 is subjected cannot be well transmitted to the screen board 1, so that the flatness of the screen board 1 is affected.

In some embodiments, it is also required that a force through which the adhesive film is peeled off from a standard template (e.g., a steel plate) at 180° is not less than (e.g., greater than or equal to) 1500 g/25 mm. A unit of the peel force is 1 g/mm, i.e., 1 kg/m, i.e., 9.8067 N/m. In this way, strengths of adhesion between the screen panel 1 and the adhesive layer 5 and adhesion between the woven cloth 2 and the adhesive layer 5 are sufficient, so that the screen board 1 may be prevented from being peeled off from the woven cloth 2.

Of course, in addition to the adhesive film, the adhesive layer 5 may also be made of other materials with an adhesive function, such as an adhesive, which is not limited in the present disclosure.

In some embodiments, the adhesive layer 5 covers the back of the entire screen board 1, so that the entire hard screen board 1 may be adhered to the soft woven cloth 2 through the adhesive layer 5. Since the woven cloth 2 has air permeability, bubbles and bulges may be prevented from being generated in a range of the entire screen board 1, so that the entire screen board 1 has good flatness.

In some embodiments, there is also a need to make the woven cloth 2 cover a back of the entire adhesive layer 5, so that the stretching of the woven cloth 2 may drive the adhesive layer 5 and the hard screen board 1 to stretch, and in turn, the screen board 1 may have good flatness. In some embodiments, the screen board 1 may be adhered to a center of the woven cloth 2, and the edge of the woven cloth 2 extends to the outside of the edge of the screen board 1 to be connected to the elastic connecting members 4.

The woven cloth 2 is woven by yarns, so it has good air permeability. During the adhesion of the adhesive layer 5 to the woven cloth 2, even if there are bubbles between the adhesive layer 5 and the woven cloth 2, gas in the bubbles may be discharged from the woven cloth 2, so that bulges may be prevented from being generated between the adhesive layer 5 and the woven cloth 2, and it may be possible to facilitate to ensure the flatness of the screen board 1.

The woven cloth 2 is a member made of a soft material, in order to keep the woven cloth 2 in the stretched state, in some embodiments, the woven cloth 2 may be stretched by using the elastic connecting members 4. The elastic connecting members 4 themselves have elasticity. Therefore, when the elastic connecting members 4 are connected to the woven cloth 2 and the frame 3 separately, the woven cloth 2 may be stretched by virtue of the elasticity of the elastic connecting members 4, and the woven cloth 2 may be forced to be stretched to the flat stretched state. In some embodiments, in order to simplify an overall structure of the projection screen 11, a direction of the elastic force of the elastic connecting members 4 is generally the direction of the tension. For example, when the elastic connecting members 4 are connected between the woven cloth 2 and the frame 3, the elastic connecting members 4 may stretch the woven cloth 2 toward the frame 3 until the woven cloth 2 is stretched to the stretched state.

The woven cloth 2 and the screen board 1 are adhered to each other through the adhesive layer 5, when the woven cloth 2 is stretched outward, the screen board 1 is also stretched until the screen board 1 is stretched to the flat state. Therefore, the good flatness of the screen board 1 may be maintained, a display effect of the image projected on the front of the screen board 1 is good, and distortion and deformation of the projected image may be avoided.

For the projection screen in some embodiments of the present disclosure, the screen board 1 may be fixed through the woven cloth 2, the elastic connecting members 4, and the frame 3. In addition, the woven cloth 2 may be in the stretched state through stretching action of the elastic connecting members 4, and the tension may be applied to the screen board 1 through the transmission of the adhesive layer 5, so that the hard screen board 1 is also in the stretched state, and it may be possible to facilitate to maintain the screen board 1 in the flat state.

Figure 6:
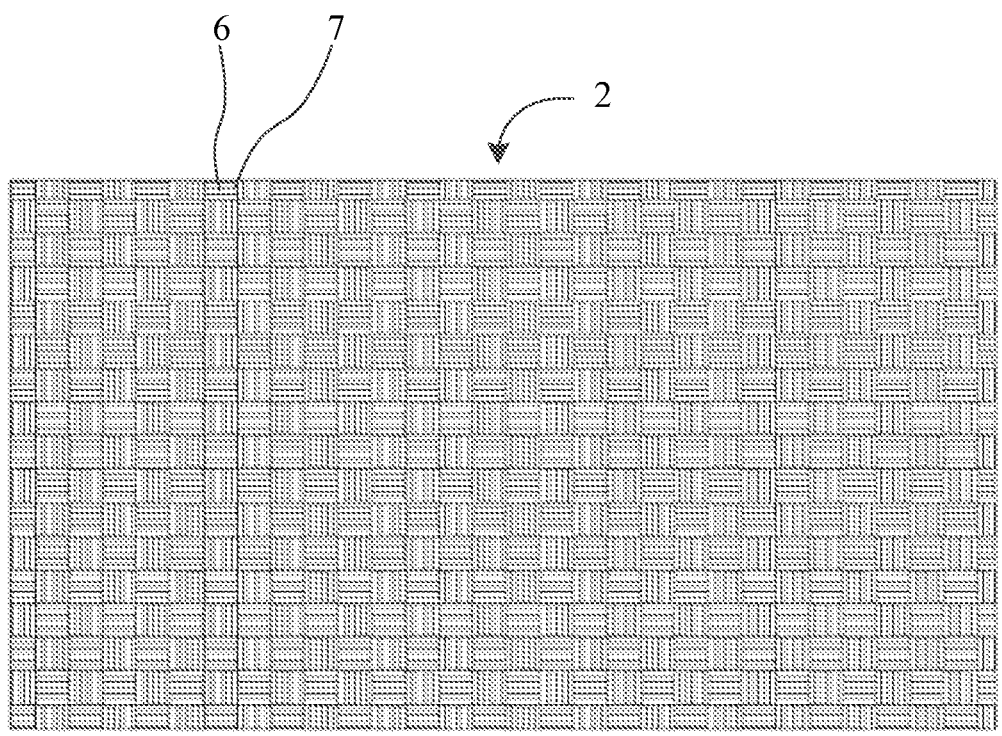
FIG. 6 is a diagram showing a structure of a woven cloth in a projection screen, in accordance with some embodiments.
Figure 7:
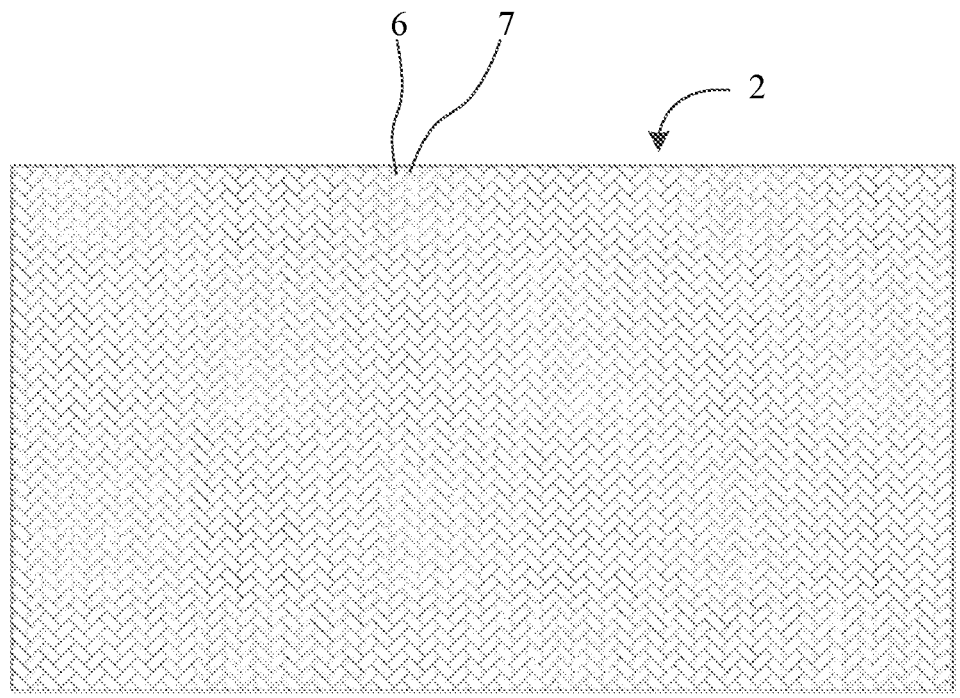
FIG. 7 is a diagram showing a structure of another woven cloth in a projection screen, in accordance with some embodiments.
Figure 8:
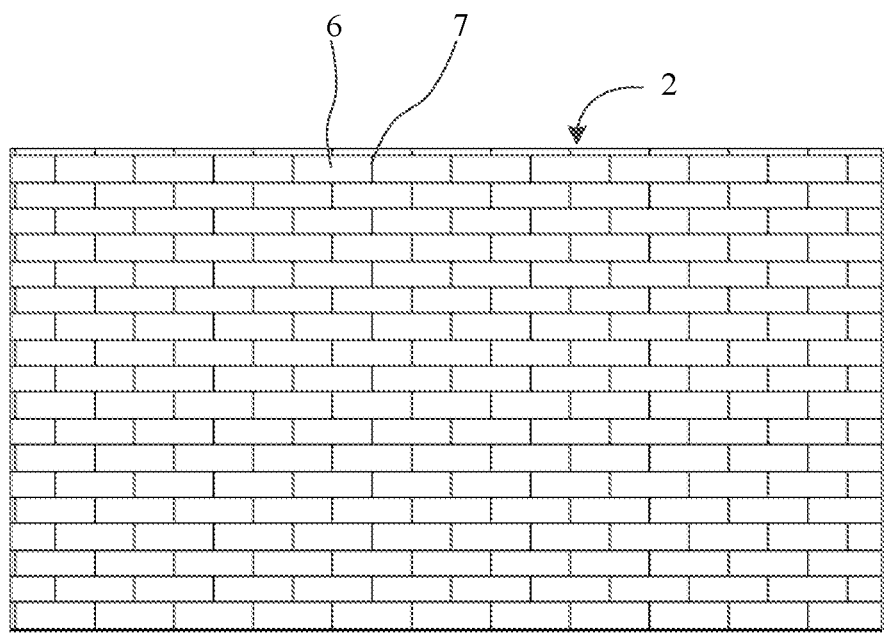
FIG. 8 is a diagram showing a structure of yet another woven cloth in a projection screen, in accordance with some embodiments.
Figure 9:
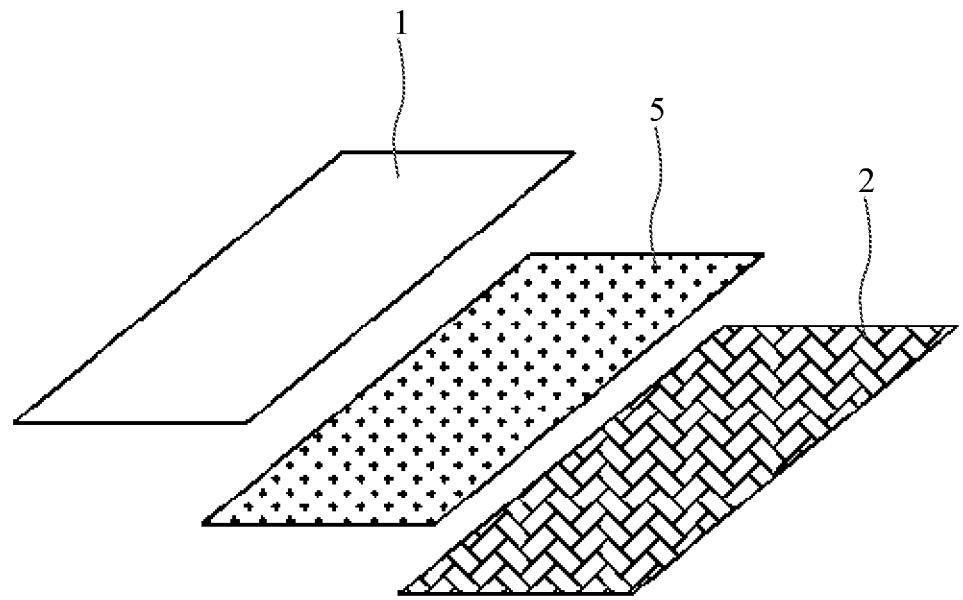
FIG. 9 is an exploded view of a screen board, an adhesive layer, and a woven cloth in a projection screen, in accordance with some embodiments.

As shown in FIGS. 6 to 8, in some embodiments, the woven cloth 2 is formed by weaving fibers 6 in different weaving directions in a staggered manner, and air-permeable gaps 7 are formed between adjacent fibers 6. In FIGS. 6 to 8, the woven cloths 2 is woven by using different weaving ways, and thus patterns of the woven cloths 2 in FIGS. 6 to 8 are different. It can be seen from FIGS. 6 to 8 that, the entire woven cloth 2 is woven by a plurality of strands of fibers 6, and the air-permeable gaps 7 formed between adjacent fibers 6 are distributed in the entire woven cloth 2. In this way, when the adhesive layer 5 is adhered to the woven cloth 2, air-permeable gaps 7 are uniformly distributed in a range of the entire adhesive layer 5, so that bubbles and bulges are less likely to occur in the range of the entire adhesive layer 5, and it may be possible to facilitate to ensure the flatness of the screen board 1.

In some embodiments, fiber specifications of the woven cloth 2 are in a range of 800 D/36 F to 1200 D/36 F inclusive in a warp direction, and in a range of 800 D/36 F to 1200 D/36 F inclusive in a weft direction. For example, they may each be 800 D/36 F, 900 D/36 F, 1000 D/36 F, 1100 D/36 F, or 1200 D/36 F. D (dinier) in 800 D/36 F to 1200 D/36 F refers to a unit of thickness of a yarn, which is expressed in grams of a weight of the yarn that may be weighed at a length of 9000 meters. The larger D is, the thicker the yarn is. For example, a yarn of 1200 D is thicker than a yarn of 800 D. F (filament) refers to the number of spun yarns, and 1200 D/36 F means that a yarn includes 36 spun yarns. During production, in a case where D is same and F is different, the greater F is, the greater a weaving difficulty is, and the smaller F is, the smaller the weaving difficulty is. Similarly, in a case where F is same and D is different, the smaller D is, the greater the weaving difficulty is, and the greater D is, the smaller the weaving difficulty is. For example, yarns with F divided by D less than 1 are referred to as ultrafine fibers. In this case, the greater a difference between F and D is, the greater a difficulty in production and subsequent weaving is.

In some embodiments, the projection screen 11 includes a plurality of elastic connecting members 4. Considering that the plurality of elastic connecting members 4 are arranged at intervals, that is, positions where the plurality of elastic connecting members 4 apply the force to the woven cloth 2 are not consecutive at the edge of the woven cloth 2, a portion of the edge of the woven cloth 2 between two elastic connecting members 4 is not directly subjected to the tension of the plurality of elastic connecting members 4, and thus the force to which various positions at the edge of the woven cloth 2 are subjected is not uniform. If the woven cloth 2 is excessively soft, deformation of portions stretched by the plurality of elastic connecting members 4 will be large, while deformation of portions that are not directly stretched by the plurality of elastic connecting members 4 will be small. As a result, deformations to different degrees may occur at the center of the woven cloth 2 in different directions, and in turn, the screen board 1 adhered to the woven cloth 2 may be unevenly pulled, and the flatness of the screen board 1 may be affected. If the woven cloth 2 has high hardness, even if the edge of the woven cloth 2 is subjected to uneven tension, large deformation will not easily occur at the center of the woven cloth 2, which is ultimately more conducive to maintaining the flatness of the screen board 1.

In some embodiments of the present disclosure, the fiber specifications of the woven cloth 2 are in the range of 800 D/36 F to 1200 D/36 F inclusive in the warp direction, and in the range of 800 D/36 F to 1200 D/36 F inclusive in the weft direction, and D is in a range of 800 to 1200 inclusive, so that the woven cloth 2 may have high hardness.

In addition, the woven cloth 2 is able to well transmit the force when stretched, and has stable properties, and is able to adapt to a wide range of environments. For example, good flatness and reliability of the woven cloth 2 may be maintained at an ambient temperature in a range of −10° C. to 40° C. inclusive.

In some embodiments, a warp density of the woven cloth 2 is in a range of 11 yarns per centimeter (yarns/cm) to 17 yarns per centimeter (yarns/cm) inclusive, and a weft density is in a range of 9 yarns per centimeter (yarns/cm) to 15 yarns per centimeter (yarns/cm) inclusive. For example, the warp density is 11 yarns/cm, 12 yarns/cm, 13 yarns/cm, 14 yarns/cm, 15 yarns/cm, 16 yarns/cm, or 17 yarns/cm; the weft direction density is 9 yarns/cm, 10 yarns/cm, 11 yarns/cm, 12 yarns/cm, 13 yarns/cm, 14 yarns/cm, or 15 yarns/cm. A lateral direction of the cloth is the warp direction, and a longitudinal direction is the weft direction. The warp direction defines a width of the cloth, which is commonly referred to as a breadth; and the weft direction defines a length of the cloth. In a case where a density of the woven cloth 2 is excessively large, the air-permeable gaps 7 between adjacent fibers 6 are small, which does not facilitate to discharge the gas between the adhesive layer 5 and the woven cloth 2 when they are adhered. In a case where the density of the woven cloth 2 is excessively small, the air-permeable gaps 7 are large. Since the woven cloth 2 is loosely woven, the woven cloth 2 is easy to deform, which does not facilitate to maintain the flatness of the screen board 1.

In some embodiments, the warp density of the woven cloth 2 is 11 yarns/cm to 17 yarns/cm, and the weft density is 9 yarns/cm to 15 yarns/cm. In this way, not only can the woven cloth 2 have high compactness, but also the woven cloth 2 can have good air permeability, so as to ensure that a size of an air-permeable gap 7 is sufficient to discharge the gas between the adhesive layer 5 and the woven cloth 2. During the adhesion of the adhesive layer 5 to the woven cloth 2, even if the bubbles are generated between the adhesive layer 5 and the woven cloth 2, the gas in the bubbles may still be discharged through the air-permeable gaps 7. As a result, the bulges may be prevented from being generated between the woven cloth 2 and the screen board 1, and it may be possible to facilitate to improve the flatness of the screen board 1. In addition, the woven cloth 2 may have sufficient strength, and is not easy to deform.

During operation of the projection screen 11 according to some embodiments of the present disclosure, the woven cloth 2 is kept in the flat state by virtue of the stretching of the elastic connecting members 4. Therefore, the woven cloth 2 also needs to have certain strength and tear resistance, so as to prevent normal use of the projection screen from being affected due to breakage of the woven cloth 2 during use. In some embodiments of the present disclosure, a tear resistance of the woven cloth 2 is in a range of 120 N to 140 N inclusive (e.g., 120 N, 130 N, or 140 N) in the warp direction, and in a range of 120 N to 140 N inclusive (e.g., 120 N, 130 N, or 140 N) in the weft direction, so as to ensure that the woven cloth 2 meets requirements for the normal use of the projection screen 11, and to effectively prevent the woven cloth 2 from being torn when subjected to a sudden strong impact.

In addition, clothes woven from fibers each have a certain shrinkage rate. In some embodiments of the present disclosure, the woven cloth 2 is adhered to the back of the screen board 1, and the woven cloth 2 is tensioned to ensure the flatness of the screen board 1. If the woven cloth 2 shrinks or deforms, the flatness of the screen board 1 will be affected. In some embodiments, the shrinkage rate of the woven cloth 2 is required to be set in a range of 2% to 3% inclusive. If it exceeds 3%, the woven cloth 2 may shrink during use, and the flatness of the screen board 1 may be affected.

Compared with fixing the screen board 1 on the back support plate 204, the projection screen 11 according to some embodiments of the present disclosure adopts the woven cloth 2 to greatly reduce a weight of the projection screen 11, and is easy to install and low in cost. Of course, in order to further reduce the weight of the projection screen 11, a weight of the woven cloth 2 may be set in a range of 280 g/m$^2$ to 330 g/m$^2$ inclusive.

As described above, in some embodiments, the hard screen board 1 usually includes the optical structure layers.

Therefore, it has certain strength and rigidity, and may also have certain perpendicularity in a vertical free sagging state, which makes the screen board 1 seem to be flat. However, due to insufficient rigidity of the screen board 1, if there is no support or there is interference from external force, the hard screen board 1 still cannot meet the flatness requirements required for display. If the screen board 1 is uneven, there will be problems such as deformation, blurring, uneven brightness, or other deterioration during the display of the projected image.

In order to fix the hard screen board 1, the woven cloth 2 may be used as a connection structure. In some embodiments, the woven cloth 2 has characteristics of inelasticity, ultra-thinness, compactness and high strength, so that when the woven cloth 2 and the screen board 1 are adhered, they may form an integral structure. As a result, it may be possible to facilitate the transmission of the force, and the screen board 1 may be stretched along with the deformation of the woven cloth 2.

In some embodiments, a color of the woven cloth 2 may be black, so that the woven cloth 2 may cover the region on the back of the screen board 1 opposite to the light-receiving region, and play roles of shading light and protecting the screen board 1. This is because the hard screen board 1 includes the optical structure layers and has certain light transmittance, and particularly, in a case where the projection screen 11 is the front projection screen, an innermost layer of the projection screen 11 (a layer farthest away from a viewer stand in front of the projection screen 11) is a reflective layer. The reflective layer is able to reflect the projection beams. However, since a reflectivity of 100% cannot be achieved, a part of the projection beams may escape from the reflective layer, which causes a decrease in image contrast. Therefore, the black woven cloth is used to shade light on the back of the screen board 1, which facilitates to prevent light leakage, as well as to prevent the back of the screen board from being scratched, and to protect the screen board 1.

In some embodiments, the adhesive layer 5 generally has a thermal expansion coefficient similar to or the same as that of the screen board 1, or the adhesive layer 5 has certain ductility, so that when the screen board 1 expands with heat and contracts with cold due to a temperature change, the adhesive layer 5 may play a certain buffering role. As a result, influence of the thermal expansion and contraction of the screen board 1 on a projected image may be reduced, and it may be possible to facilitate to maintain the flatness of the hard screen board 1.

The projection screen 11 according to some embodiments of the present disclosure includes the hard screen board 1, the soft woven cloth 2, the adhesive layer 5, the frame 3, and the elastic connecting members 4. The frame 3 is arranged on the peripheral side of the screen board 1. The front of the screen board 1 is the light-receiving surface of the projection beams, and the back of the screen board 1 is adhered to the woven cloth 2 through the adhesive layer 5. The woven cloth 2 covers the region on the back of the screen board 1 opposite to the light-receiving region on the front of the screen board 1, and the edge of the woven cloth 2 is outside the edge of the screen board 1. Both ends of the elastic connecting member 4 are connected to the edges of the woven cloth 2 and the frame 3 respectively, so as to stretch the woven cloth 2 and the screen board 1 to the flat state through the tension of the elastic connecting members 4. In this way, the screen board 1 and the frame 3 may be fixed and positioned by virtue of the elastic connecting members 4 and the soft woven cloth 2, and the screen board 1 may be in the flat stretched state without deformation by virtue of the elasticity of the elastic connecting members 4. Furthermore, since the woven cloth 2 has good air permeability, the bulges are not easy to occur between the woven cloth 2 and the adhesive layer 5, which facilitates to improve the flatness of the screen board 1, and to improve the quality of the projected image.

Some embodiments of the present disclosure provide an assembly method of the projection screen. A structure, an operation principle and functions of the projection screen have all been described in detail previously, and details will not be repeated herein.

Figure 11:
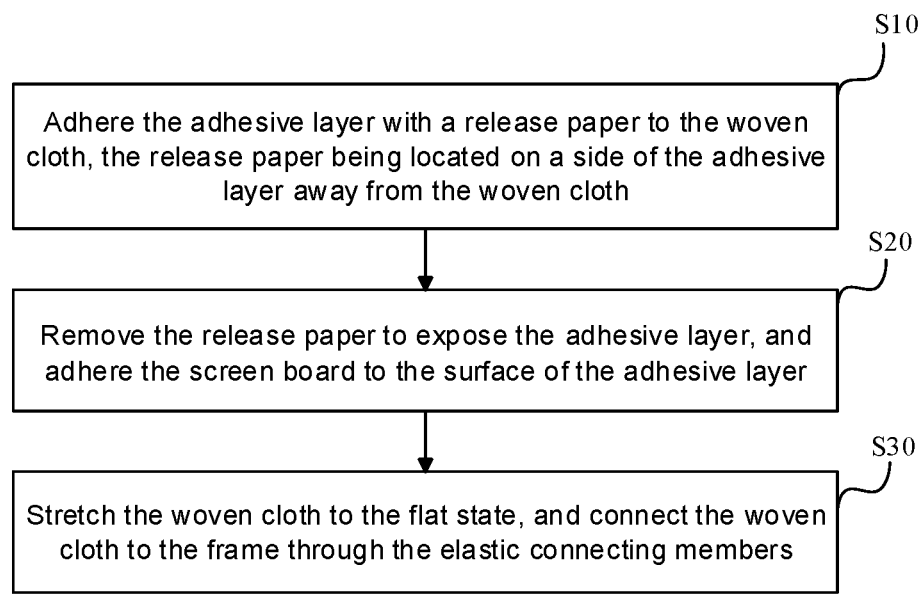
FIG. 11 is a flow diagram of an assembly method of a projection screen, in accordance with some embodiments.

As shown in FIG. 11, the assembly method of the projection screen in some embodiments of the present disclosure includes S10 to S30.

In S10, the adhesive layer with a release paper is adhered to the woven cloth, the release paper being located on a side of the adhesive layer away from the woven cloth.

Generally, the adhesive layer with adhesiveness is mostly adhered to a separator, such as the release paper. The release paper is also referred to as an isolation paper or an anti-adhesive paper, and is an anti-adhesive paper capable of preventing adhesion of an adhesive material in the adhesive layer and protecting the adhesive material from being polluted. The release paper is generally adhered to a surface of the adhesive layer.

In S10, a side of the adhesive layer is adhered to the release paper, and another side of the adhesive layer, which is not provided with the release paper, may be adhered to the woven cloth by means of rolling, so that seamless adhesion between the adhesive layer and the woven cloth may be ensured. In addition, in the above process, if the bubbles occur between the woven cloth and the adhesive layer, the gas in the bubbles may be discharged through the woven cloth, so that the bulges may be prevented from being generated in the adhesive layer, and it may be possible to facilitate to improve the flatness of the screen board. After the adhesion is accomplished, the release paper is located on the side of the adhesive layer away from the woven cloth.

In S20, the release paper is removed to expose the adhesive layer, and the screen board is adhered to the surface of the adhesive layer. After the release paper is removed, the surface of the adhesive layer with adhesiveness may be exposed, and the screen board is adhered to the surface of the adhesive layer by means of rolling to form a structure in which the woven cloth, the adhesive layer and the screen board are sequentially arranged.

In S30, the woven cloth is stretched to the flat state, and is connected to the frame through the elastic connecting members. For example, the edge of the woven cloth may be connected to the first ends of the elastic connecting members, and the second ends of the elastic connecting members may be connected to the frame, so as to stretch the woven cloth and the screen board to the flat state by virtue of the tension of the elastic connecting members.

In the assembly method of the projection screen according to some embodiments of the present disclosure, the screen board is connected to the woven cloth through the adhesive layer, and since the woven cloth has good air permeability, the bulges are not easy to occur between the woven cloth and the adhesive layer, so that the flatness of the screen board may be further improved, and the quality of the projected image is high.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

A person skilled in the art will understand that, the scope of disclosure involved in the present disclosure is not limited to technical solutions formed by specific combinations of the above technical features, and shall cover other technical solutions formed by any combination of the above technical features or their equivalent features without departing from the concept of disclosure, such as technical solutions formed by replacing the above features with technical features with similar functions disclosed in some embodiments (but not limited thereto).

What is claimed is:

1. A projection screen, comprising:
   a screen board, at least a partial region of a front of the screen board being configured as a light-receiving region of projection beams;
   a woven cloth being arranged on a back of the screen board, the woven cloth covering at least a region of the screen board corresponding to the light-receiving region, and an edge of the woven cloth disposed outside an edge of the screen board;
   an adhesive layer connecting the screen board and the woven cloth to each other;
   a frame arranged on a peripheral side of the screen board; and
   elastic connecting members, first ends of the elastic connecting members being connected to the woven cloth, and second ends of the elastic connecting members being connected to the frame, so as to stretch the woven cloth and the screen board to a flat state by tension of the elastic connecting members; wherein
   the woven cloth includes fibers in different weaving directions, the fibers are woven in a staggered manner, and air-permeable gaps are provided between adjacent fibers; the woven cloth satisfies at least one of the following:
      fiber specifications of the woven cloth are in a range of 800 D/36F to 1200 D/36F inclusive in a warp direction, and in a range of 800 D/36F to 1200 D/36F inclusive in a weft direction;
      a warp density of the woven cloth is in a range of 11 yarns/cm to 17 yarns/cm inclusive, and a weft density thereof is in a range of 9 yarns/cm to 15 yarns/cm inclusive;
      a tear resistance of the woven cloth is in a range of 120 N to 140 N inclusive in the warp direction, and in a range of 120 N to 140 N inclusive in the weft direction; or,
      a shrinkage rate of the woven cloth is in a range of 2% to 3% inclusive.

2. The projection screen according to claim 1, wherein the frame provides a rectangular hollow region, and the hollow region is configured to accommodate the screen board.

3. The projection screen according to claim 2, wherein the frame is outside the edge of the woven cloth;
   the first ends of the elastic connecting members connected to the woven cloth are inside the second ends of the elastic connecting members connected to the frame.

4. The projection screen according to claim 2, wherein the frame is inside the edge of the woven cloth, and the edge of the woven cloth extends out of the frame and is bent in a reverse direction, and extends to the back of the screen board;
   the first ends of the elastic connecting members connected to the woven cloth are outside the second ends of the elastic connecting members connected to the frame.

5. The projection screen according to claim 4, wherein the frame includes a support portion, and the edge of the woven cloth extends out of the support portion and is bent in a reverse direction, and extends to the back of the screen board, so as to be connected to the elastic connecting members after wrapping the support portion.

6. The projection screen according to claim 1, wherein the woven cloth includes a rigid fixing member at the edge of the woven cloth, and the rigid fixing member is configured to be connected to the elastic connecting members.

7. The projection screen according to claim 6, wherein the rigid fixing member has a straight rod structure, and a closed hole matched with the straight rod structure is provided at the edge of the woven cloth, and the rigid fixing member is disposed in the closed hole;
   or,
   the rigid fixing member is sewn to the edge of the woven cloth.

8. The projection screen according to claim 6, wherein the woven cloth further includes through holes at the edge of the woven cloth, and the rigid fixing member is closer to the edge of the woven cloth than the through holes;
   the elastic connecting members are hung on the rigid fixing member after passing through the through holes.

9. The projection screen according to claim 1, wherein a direction of the tension of the elastic connecting members is substantially parallel to a plane where the screen board is located.

10. The projection screen according to claim 1, wherein the projection screen comprises a plurality of elastic connecting members, and the plurality of elastic connecting members are distributed around the projection screen at a same density or at different densities.

11. The projection screen according to claim 10, wherein a distribution density of elastic connecting members on upper and lower sides of the projection screen is greater than a distribution density of elastic connecting members on left and right sides of the projection screen.

12. The projection screen according to claim 1, further comprising:
   a front decorative frame, wherein the front decorative frame is located on the front of the screen board, and is connected to the frame;
   the front decorative frame is configured to cover the edge of the woven cloth; or, the front decorative frame is configured to cover the edge of the woven cloth and the elastic connecting members.

13. The projection screen according to claim 1, wherein the adhesive layer covers the back of an entire screen board.

14. The projection screen according to claim 13, wherein the woven cloth covers a back of an entire adhesive layer.

15. The projection screen according to claim 14, wherein the screen board is located at a center of the woven cloth, and the edge of the woven cloth extends in a direction away from the edge of the screen board.

16. The projection screen according to claim 1, wherein thermal expansion coefficients of the adhesive layer and the screen board are substantially same; or,
   the adhesive layer has ductility.

17. The projection screen according to claim 16, wherein the adhesive layer is a base-less adhesive film, and the adhesive film satisfies at least one of the following:
   the adhesive film is a black adhesive film;

a thickness of the adhesive film is in a range of 0.08 mm to 0.15 mm inclusive; or, a force through which the adhesive film is peeled off from a standard template at 180° is not less than 1500 g/25 mm.

18. A projection system, comprising:

a projection device; and the projection screen according to claim 1, the projection device being configured to project an image onto the screen board of the projection screen.

* * * * *